W. J. WACHOWITZ.
MACHINE FOR IRONING MILK CANS.
APPLICATION FILED APR. 9, 1921.
1,420,506.
Patented June 20, 1922.
2 SHEETS—SHEET 1.
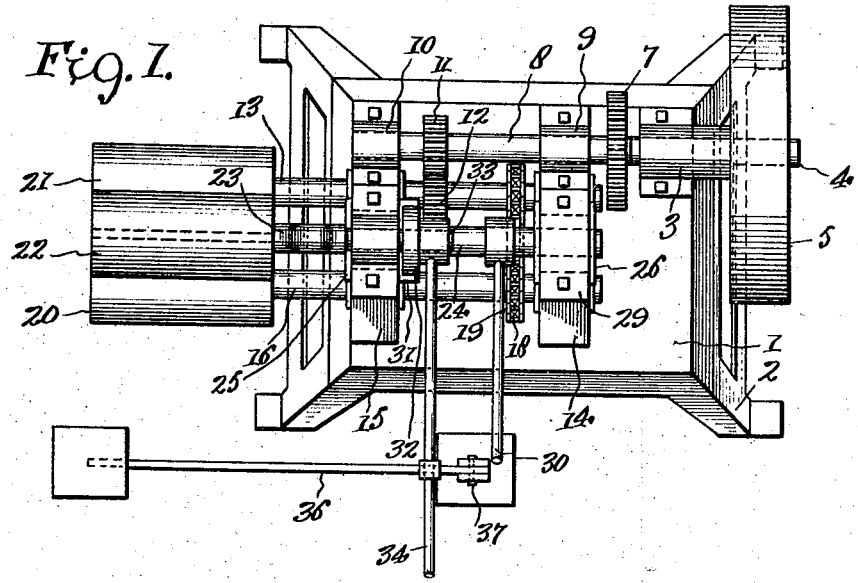
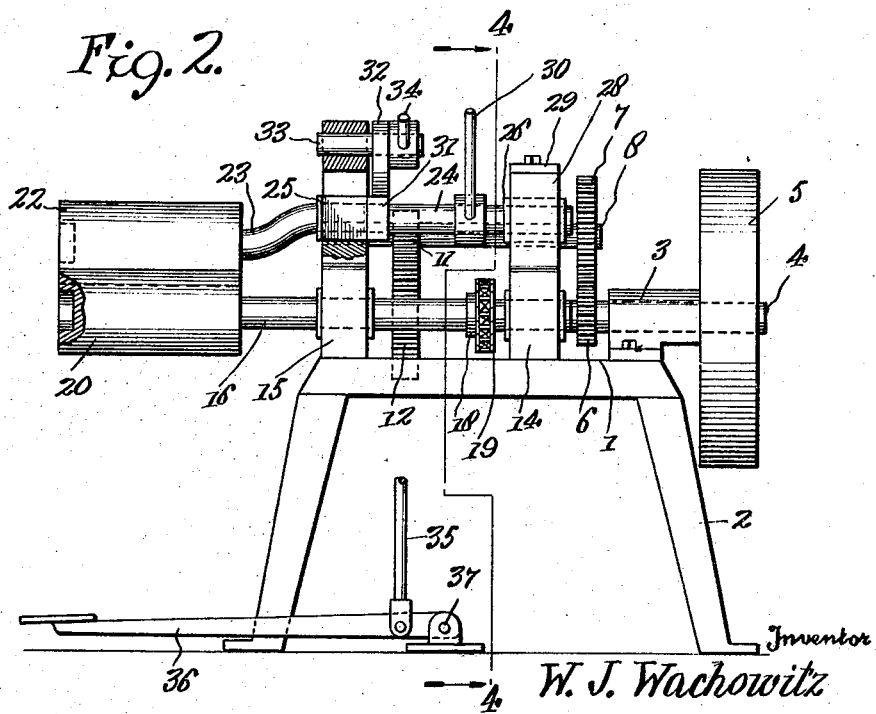
Inventor
W. J. Wachowitz
By Mawhinney & Mawhinney
Attorneys

W. J. WACHOWITZ.
MACHINE FOR IRONING MILK CANS.
APPLICATION FILED APR. 9, 1921.

1,420,506.

Patented June 20, 1922.
2 SHEETS—SHEET 2.

Inventor
W. J. Wachowitz
by Mawhinney & Mawhinney
Attorneys.

UNITED STATES PATENT OFFICE.

WALTER J. WACHOWITZ, OF MANITOWOC, WISCONSIN, ASSIGNOR TO MANITOWOC PLATING WORKS, OF MANITOWOC, WISCONSIN, A CORPORATION OF WISCONSIN.

MACHINE FOR IRONING MILK CANS.

1,420,506.       Specification of Letters Patent.  Patented June 20, 1922.

Application filed April 9, 1921. Serial No. 460,119.

*To all whom it may concern:*

Be it known that I, WALTER J. WACHOWITZ, a citizen of the United States, residing at Manitowoc, in the county of Manitowoc and State of Wisconsin, have invented new and useful Improvements in Machines for Ironing Milk Cans, of which the following is a specification.

The present invention relates to improvements in machines for ironing milk cans, and has for an object to provide a machine which will effectively, quickly and at small cost remove the dents or other inequalities in the walls of milk or other cans, and to restore them to a substantially new condition.

Another object of the invention is to so associate and combine the various parts of a machine of this character to the end that the apparatus will be compact, easily transported and in readiness for use wherever a source of power is at hand.

A further object of the invention resides in providing a machine in which the milk cans may be quickly attached and removed, and for this purpose more specifically the invention resides in the provision of pressure rollers adapted to fit within and without the milk or other can, one of which rollers is mounted on an offset shaft capable of being manually turned to move it bodily away from the companion rollers to create a gap large enough to permit passage of the body of the can.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a top plan view of an improved machine for ironing milk cans, as constructed in accordance with the present invention;

Fig. 2 is a view in side elevation of the same, with portions thereof broken away;

Figure 3:
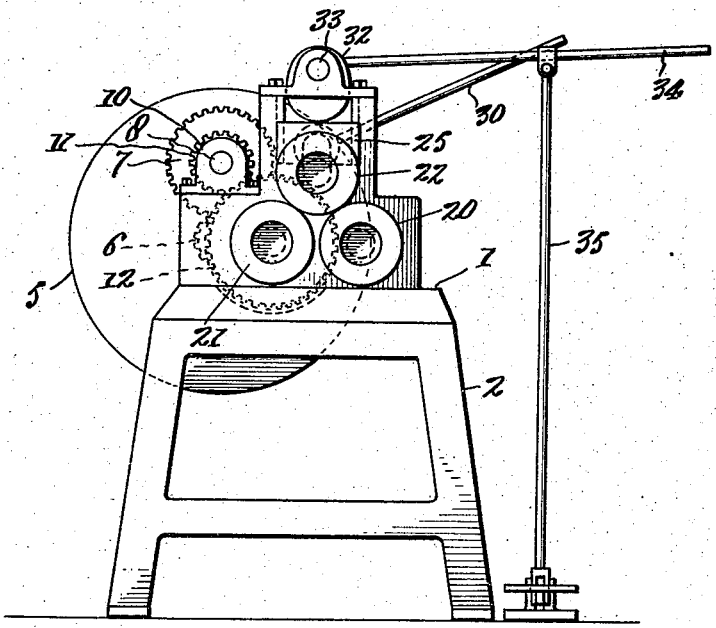
Fig. 3 is an end view of the machine.
Figure 4:
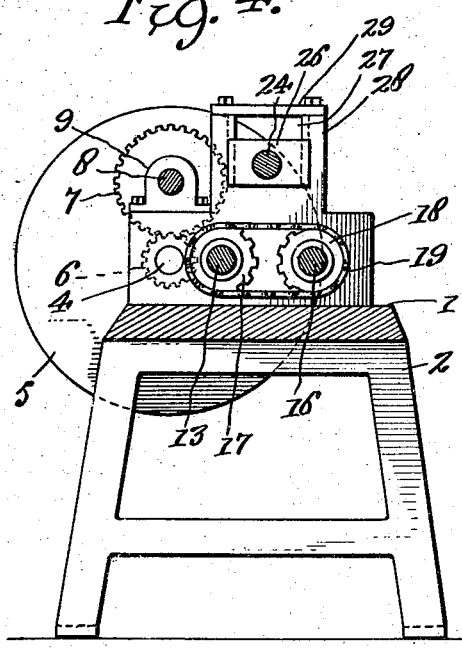
Fig. 4 is a transverse sectional view taken on the line 4—4 in Fig. 2.

Referring more particularly to the drawings, 1 designates a base or platform supported by legs 2 which preferably diverge in the manner best illustrated in Fig. 1, so that a relatively wide purchase may be had preventing the possible tilting or falling of the machine, due to the weight that overhangs in the rollers. In a substantial bearing 3 on the base 1 is journaled a shaft 4, having a pulley 5 thereon, to engage with a belt from a suitable source of power.

Obviously, other means may be employed to drive the shaft 4. A pinion 6 on the shaft 4 meshes with a comparatively large gear wheel 7 on a drive shaft 8 journaled in appropriate bearings 9 and 10, also receiving their support from the base 1. On the shaft 8, between the bearings 9 and 10, is a pinion 11 which meshes with a gear wheel 12, carried on a shaft 13, which is journaled in bearings 14 and 15.

The bearings 14 and 15 are comparatively wide, extending substantially over the full width of the base 1, and they also carry the bearings 9 and 10 of the shaft 8 at one side, being cut away for this purpose. These bearings 14 and 15 further provide a support in which is journaled a shaft 16, mounted horizontally beside and spaced from the shaft 13. Near the bearing 14 these two shafts 13 and 16 are provided with sprockets 17 and 18 over which runs a chain 19. The purpose of this arrangement is to secure rotation of the shafts 13 and 16 in the same direction.

The shafts 13 and 16 extend outwardly beyond the base 1 and the bearing 15, and carry a pair of rollers 20 and 21 which are of a suitable size and shape to fit on the exterior of the cylindrical wall of a milk can. Co-operating with these two rollers 20 and 21 is a third roller 22 disposed above the space between the two lower rollers and in substantially triangular arrangement. The upper roller is carried by the offset portion 23 of a shaft 24 having suitable bearing blocks 25 and 26, sliding vertically in slots 27, provided in the upper extensions 28 of the bearings 14 and 15.

Removable cap pieces 29 provided above the slots 27, to permit of the removal and replacement of the bearing blocks 25 and 26. The shaft 24 is not automatically rotated, but it carries a handle 30 fixed thereto and projecting outwardly in a convenient position for the operator's hand, whereby he may swing the shaft 24, for instance, through 90° or a half rotation in order to raise and lower the roller 22, which is accomplished through the offset portion 23 of the shaft.

The bearing block 25 is extended rearwardly beyond the front bearing 15, as is indicated at 31 in Fig. 2, in order to provide an adequate bearing surface for engagement by a cam or eccentric 32, carried by a pin 33 turning in the bearing 15 above the shaft 24. The pin is also provided with a handle or lever 34 projecting out in the same direction with the handle 30 so that both of these parts may be conveniently manipulated.

The lever 34 is connected to a link 35 pivoted at its bottom to a treadle 36, fulcrumed at 37 to the floor or supporting surface.

Figure 5:
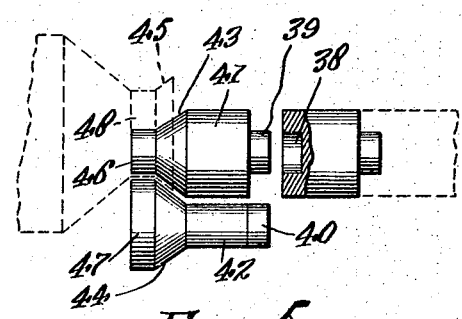
Fig. 5 is a fragmentary view of a detail.

Referring more particularly to Fig. 5, the various rollers 20, 21 and 22 are provided with socketed ends 38 for the purpose of receiving studs 39 and 40, on co-operating extension rolls 41 and 42 which are provided with inclined or conical surfaces 43 and 44, conforming substantially to the lip 45 of the milk can, shown in dotted lines in Fig. 5 in a fragmentary way. The extension rolls are also provided with cylindrical portions 46 and 47 to take against the neck portion 48 of the can.

In use, a belt for instance, is used to rotate the shaft 4 and through the pinion 6 and gear wheel 7 a reduced motion is communicated to the drive shaft 8. Movement is further conveyed through the pinion 11 and gear wheel 12 to the lower roller shaft 13, and thence through the chain 19 to the companion roller shaft 16. These two shafts turn the rollers 20 and 21 positively, and cause the rolling of the can through the space within the triangular rollers.

The upper roller 22 fits within the can and presses out any indentions made therein, suitable pressure being imposed by placing the weight, for instance, upon the treadle 36 which will cause the cam 32 to descend against the extension 31 of the bearing block 25.

In inserting and removing the milk cans. the handle 30 may be swung so as to partially rotate the shaft 24. Due to the offset portion 23, the upper roller 22 will be raised and lowered so that the body of the can may slip back and forth between the several rollers.

In removing dents from the neck and mouth portions of the can, the extension rolls are put in place and engaged with the can substantially in the manner indicated in Fig. 5.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. A machine for ironing milk cans and the like including pressure rollers adapted to roll in contact with the exterior and interior surfaces of the can to be ironed, a rotary shaft having an off-set portion carrying the pressure roller which extends upon the interior of the can and adapted upon rotation to bring the pressure roller carried thereby against the inner surface of the can and into a central position within the can to permit of the withdrawal of the can from such interior pressure roller.

2. An ironing machine for milk cans comprising pressure rolls adapted to fit inside and out of the cans and to move in contact with the wall of the can at opposite sides thereof, means for pressing said rolls together on the can, and means independent of said last named means whereby the inner roll is movable bodily away from the other roll.

3. A machine for ironing milk cans and the like including pressure rollers adapted to fit against the exterior and interior surfaces of the can, a shaft carrying the interior pressure roller and having an off-set portion upon which such roller is journaled, said shaft being rotatable to swing the inner roller into and out of a central position within the can, and means for moving the inner roller under pressure against the inner surface of the can without rotating said shaft.

4. In an ironing machine for milk cans, the combination of a roller adapted to rotate in contact with the outside cylindrical wall of a milk can, a second roller adapted to fit within the mouth of the can and roll in contact with the interior wall of said can, means for imparting rotation to the outside roller, an offset shaft for supporting the inside roller, means for imposing pressure on said offset shaft, and means for rotating said offset shaft.

5. A machine for ironing milk cans comprising a pair of lower positively-rotated rolls located side by side and adapted to receive the exterior surface of a can or the like, a third roll mounted above the space between the two first named rolls and adapted to come in contact with the exterior wall of the can, a shaft movable toward and from the two first mentioned rolls and having an off-set end portion movably supporting the upper third roll and acting to shift the latter roll toward and from the first two rolls, means whereby said shaft may be angularly adjusted, and means whereby the shaft and roll carried by the off-set portion thereof may be adjusted bodily toward the first two mentioned rolls without angular adjustment of the shaft.

6. A machine for ironing milk cans and the like comprising a supporting structure, a pair of horizontal shafts disposed therein side by side, means to rotate the shafts in the same direction, rolls on said shafts projecting at the side of the supporting structure and free thereof, a third shaft above the space between the two first mentioned shafts, said third shaft being mounted for bodily adjustment in a substantially vertical direction and having a projecting off-set portion lying above the space between the first mentioned two rolls, a third roll carried on the projecting portion of said last mentioned shaft, means whereby the last mentioned shaft may be angularly adjusted, and cam means independent of the last mentioned means for forcing the last mentioned shaft and its roll bodily toward the other shafts and the first mentioned rolls without requiring angular adjustment of such shaft.

7. In a machine for ironing milk cans, the combination of a support, a shaft journaled on said support, a roller on said shaft, a second shaft disposed above the first mentioned shaft and being vertically movable, said last mentioned shaft having an offset portion therein, a roller carried by the offset portion of said shaft and co-operating with the first mentioned roller, pressure means acting to move said shaft downwardly, and means for partially rotating said shaft, and its offset portion.

8. A machine for ironing milk cans comprising a base, bearings thereon having slots in their upper portions, shafts fixed to rotate in the lower portions of said bearings, rollers on said shafts arranged side by side, a third shaft slidable vertically in the slotted upper portions of the bearings and having an offset portion extending out between the first mentioned rollers, a third roller carried by said offset portion, means for driving the two lower shafts, and means for manually turning said upper shaft.

9. In a machine for ironing milk cans, a base, a pair of shafts arranged horizontally side by side, a pair of rollers carried by said shafts and rotating therewith, a drive shaft on the base, means to rotate said drive shaft, gearing connection between said roller shafts for driving said rollers in the same direction, an upper shaft having an offset portion, a roller carried thereby co-operating with the two first mentioned rollers, means for partially rotating said offset shaft, and means for imposing pressure upon the same.

10. In a machine for ironing milk cans, a pair of rollers arranged horizontally side by side, shafts carrying said rollers, means for driving said shafts in the same direction, a vertically movable offset shaft above the first mentioned shafts, cam means for imposing pressure on said offset shaft, a roller carried by the offset portion of said shaft, and means to partially rotate said offset shaft.

11. A machine for ironing milk cans and the like including pressure rollers adapted to fit within and without the can and to be brought forcibly together upon the can wall, and extension rollers having portions to enter and interfit with the pressure rollers whereby such extension rollers are removably carried on the end portions of the pressure rollers, said extension rollers being shaped to fit the neck portions of the can.

12. A machine for ironing milk cans and the like including relatively movable complemental pressure rolls adapted to be brought forcibly together upon the inside and outside surfaces of cans and the like, said pressure rollers having sockets in their ends, and extension rolls having projections adapted to removably fit within the sockets in said pressure rollers whereby to support the extension rollers directly from the pressure rollers and to permit of the removability of such extension rollers, said extension rollers having inclined surfaces adapted to fit the lip of the can and cylindrical surfaces joining the inclined surfaces to fit the cylindrical portion of the can inside of the inclined lip.

WALTER J. WACHOWITZ.